United States Patent
Park

(10) Patent No.: US 7,245,280 B2
(45) Date of Patent: *Jul. 17, 2007

(54) LASER DISPLAY SYSTEM

(75) Inventor: Chan Young Park, Seoul (KR)

(73) Assignee: LG Electronics Inc., Seoul (KR)

( * ) Notice: Subject to any disclaimer, the term of this patent is extended or adjusted under 35 U.S.C. 154(b) by 620 days.

This patent is subject to a terminal disclaimer.

(21) Appl. No.: 10/766,622

(22) Filed: Jan. 27, 2004

(65) Prior Publication Data

US 2004/0189589 A1   Sep. 30, 2004

(30) Foreign Application Priority Data

Mar. 3, 2003   (KR)   ........................ 10-2003-0013083

(51) Int. Cl.
G09G 3/34   (2006.01)

(52) U.S. Cl. .............................. 345/84; 345/82; 353/84

(58) Field of Classification Search ............ 345/76–77, 345/81–84, 87–90, 102, 204, 207–208, 214; 353/31, 37, 84; 349/106; 362/246, 353, 362/355, 358; 359/27, 618, 712, 891
See application file for complete search history.

(56) References Cited

U.S. PATENT DOCUMENTS

| 5,031,078 | A |   | 7/1991 | Bornhorst |
| 6,005,722 | A | * | 12/1999 | Butterworth ................. 359/712 |
| 6,426,781 | B1 | * | 7/2002 | Lee ............................. 348/754 |
| 6,577,429 | B1 | * | 6/2003 | Kurtz et al. ................. 359/279 |
| 6,874,893 | B2 | * | 4/2005 | Park ............................. 353/84 |
| 6,973,254 | B2 | * | 12/2005 | Kubota et al. ............. 385/142 |
| 2002/0028042 | A1 | * | 3/2002 | Zarian et al. ................. 385/31 |
| 2002/0063854 | A1 | * | 5/2002 | Flint ............................ 353/94 |

FOREIGN PATENT DOCUMENTS

KR   2003-4780   1/2003

* cited by examiner

Primary Examiner—Richard Hjerpe
Assistant Examiner—Mansour M. Said
(74) Attorney, Agent, or Firm—Lee, Hong, Degerman, Kang & Schmadeka

(57) ABSTRACT

Laser display system having at least more than two lasers, and a display panel for receiving an electrical picture signal, and regulating a quantity of light from the laser to form an image based on the electrical picture signal, including a light superimposer of optical fibers for superimposing the lights from the lasers, thereby improving an optical efficiency to provide a bright and clear picture.

14 Claims, 8 Drawing Sheets

2

LASER DISPLAY SYSTEM

This application claims the benefit of the Korean Application No. P2003-0013083 filed on Mar. 27, 2003, which is hereby incorporated by reference.

BACKGROUND OF THE INVENTION

1. Field of the Invention

The present invention relates to projection display systems, and more particularly, to a laser display system that uses a laser as a light source.

2. Background of the Related Art

Though a lamp has been used as a light source of a projection display system, recently, a laser display system is under development in which a laser is used in place of the lamp. The laser display system has advantages in that a clear picture can be provided since colors of a picture are clear, and close to pure colors, a range of reproduction of the colors is wide, and contrast of the picture is high.

FIG. 1 illustrates a related art laser display system.

Referring to FIG. 1, the related art laser display system is provided with a laser 10 for emitting a beam of light, a focusing device 120 for focusing the beam of light, an acousto-optic modulator (AOM) 130 for regulating transmission of the beam of light incident thereon from the focusing device 120 based on a picture signal, a polygon mirror 140 for turning, and reflecting the beam of light incident thereon from the AOM 130, to provide a horizontal image of the picture signal, a galvanometer 150 for moving up/down at a fix angle repeatedly for providing a vertical image of the picture signal, and a screen 160 for displaying the images provided at the polygon mirror 140 and the galvanometer 150.

The operation of the related art laser display system will be described.

The laser 110 emits the beam of light, and the focusing device 120 focuses the beam of light. Then, the AOM 130 regulates transmission of the focused beam of light in response to an electric signal related to the picture signal.

The polygon mirror 140 turns, and reflects the beam of light to provide the horizontal image, and the galvanometer 150 moves up/down at a fix angle repeatedly, to provide the vertical image of the picture signal. According to this, the screen 160 can display an image provided thus.

FIG. 2 illustrates a related art laser display system.

Referring to FIG. 2, the related art display system is provided with a laser 210 for emitting a beam of light, an illuminating device 220 for irradiating the beam of light to a display panel to be described later, a display panel 230 for regulating a quantity of light from the illuminating device 220 based on a picture signal, to provide an image, a projector 240 for enlarging and projecting the image, and a screen 250 for displaying the image.

The operation of the related art laser display system will be described.

When the laser 210 emits a beam of light, the illuminating device 220 irradiates the beam of light to the display panel 230. Then, the display panel 230 regulates a quantity of light based on an electric picture signal, to form a picture to be displayed. The display panel 230 is in general an LCD (Liquid Display Panel).

Thereafter, the picture formed at the display panel 230 is enlarged at the projector 240, and displayed on the screen 250.

In the meantime, a red laser, a green laser, and a blue laser are used as the laser light source, for realizing a color picture. That is, by projecting a superimposed light of red, green, and blue colors to the screen, the user can watch the color picture. The lights are superimposed by the following method in the related art.

FIG. 3 illustrates a related art light superimposer.

Referring to FIG. 3, the related art light superimposer is provided with a red laser 310, a green laser 320, a blue laser 330, first, and second filters 340, and 350 each for transmitting, or reflecting a particular wavelength.

The related art light superimposer is operated as follows.

The first filter 340 superimposes lights from the red laser and the green laser, and the second filter 350 superimposes the light superimposed at the first filter 340 with a light from the blue laser, to display the superimposed light of the three colors on the screen 360.

However, a system of the light superimposer in FIG. 3 has problems in that there is a spatial limitation in arranging the light sources, leading a size of the system large because it is required that each of the first filter 340 and the second filter 350 is arranged at 45° from a path of light without fail, and the lights from the lasers are incident on the filter at 90° with respect to each other.

That is, if the 45° arrangement of the first filter 340 and/or the second filter 350 from the path of light fails, or the light incident on the filter at 90° with respect to each other fails, transmissivity of the filters 340 and 350 changes, to have non-uniform light distribution.

FIG. 4 illustrates a light superimposer of optical fibers.

That is, referring to FIG. 4, the light superimposer is provided with a red laser 410, a green laser 420, a blue laser 430, and optical fibers 440 connected to the lasers respectively, for irradiating the color lights to the screen 450.

The light superimposer of optical fibers reduces the spatial limitation caused by arrangement of the light source, to reduce a size of the system. However, putting output surfaces of the optical fibers together exactly on one plane has been very difficult.

SUMMARY OF THE INVENTION

Accordingly, the present invention is directed to a laser display system that substantially obviates one or more of the problems due to limitations and disadvantages of the related art.

An object of the present invention is to provide a laser display system which enables an effective superimposition of lights from more than two lasers.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the laser display system having two or more than two lasers as light sources, includes a light superimposer of optical fibers for superimposing beams of light from the lasers, a rotational color separator for separating a superimposed beam light into a red beam of light, a green beam of light, and blue beam of light in succession again, an illuminating device for irradiating the red, green, and blue beams of light separated in succession to a display panel to be described later, the display panel for receiving an electrical picture signal, and regulating a quantity of light from the illuminating device based on the electric picture signal, to form an image, and a controller for matching a color area of the beam of light from the rotational color separator to a color area of a color signal from the display panel.

The light superimposer makes total reflection of the beam of light incident thereon to proceed along a core of the optical fiber by using a difference of refractive indices between the optical fiber core and an optical fiber cladding.

The light superimposer includes at least one optical fiber inlet part for receiving the red, green, and blue beams of light, an optical fiber superimposing part having at least one optical fiber inlet part unitized into one for superimposing the red, green, and blue beams of light to form a white beam of light, and an optical fiber output part for providing the white beam of light.

In other aspect of the present invention, there is provided a laser display system including a red laser, a green laser, and a blue laser for emitting a red beam of light, a green beam of light, and a blue beam of light, a light superimposer of optical fibers for superimposing the red, green, and blue beams of light from the lasers respectively, an illuminating device for irradiating the superimposed light to a display panel, a display panel for receiving an electrical picture signal, and regulating a quantity of light incident thereon from the illuminating device to form an image based on the electrical picture signal, and a controller for receiving, and separating the picture signal into red, green, and blue signals, and turning on a relevant color laser in succession.

The light superimposer makes a light incident thereon to proceeds along an optical fiber core by reflecting the light totally by using a difference of refractive indices between the optical fiber core, and an optical fiber cladding.

The light superimposer includes at least one optical fiber inlet part for receiving the red, green, and blue beams of light, an optical fiber superimposing part having at least one optical fiber inlet part unitized into one for superimposing the red, green, and blue beams of light to form a white beam of light, and an optical fiber output part for providing the white beam of light.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

First Embodiment

Figure 1:
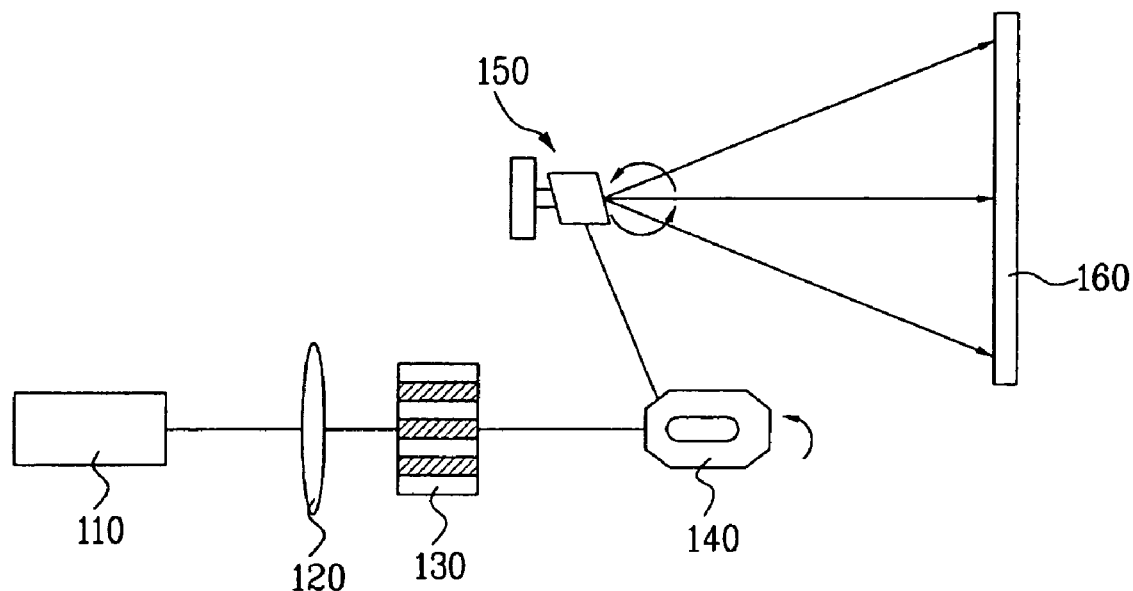
FIG. 1 illustrates a diagram of one example of a related art laser display system.
Figure 2:
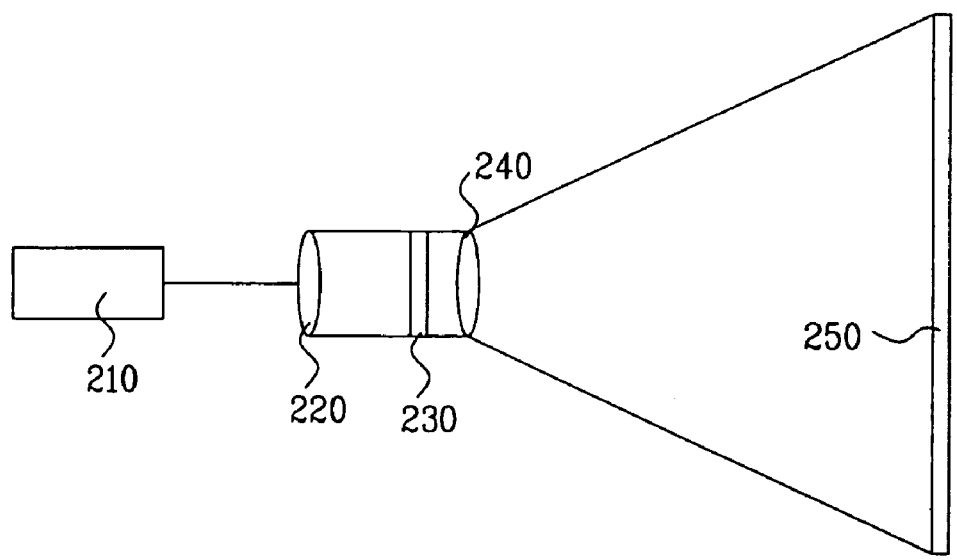
FIG. 2 illustrates a diagram of another example a related art laser display system.
Figure 3:
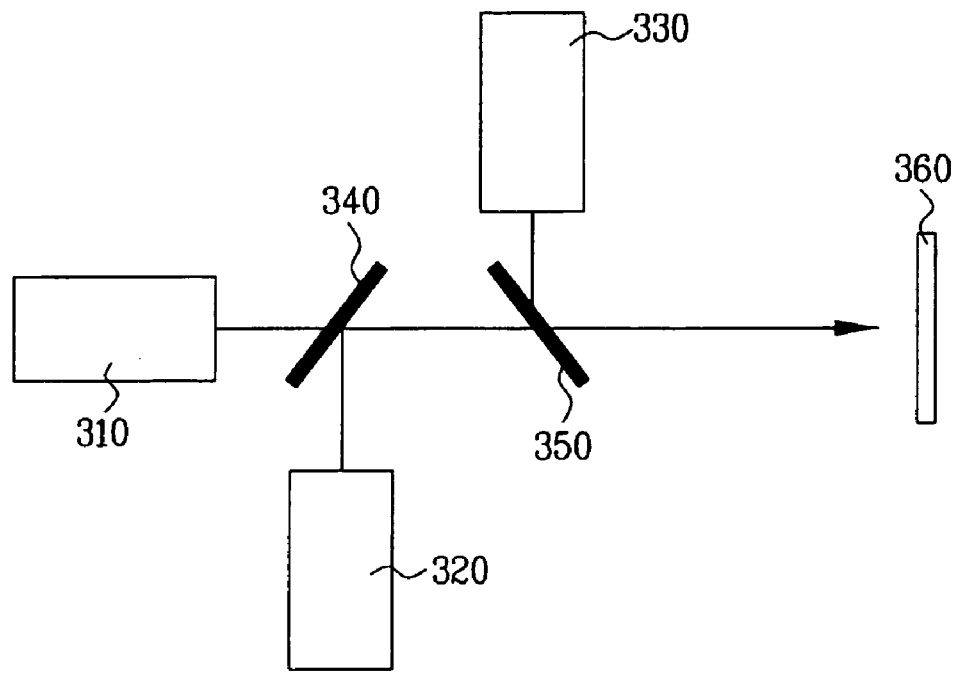
FIG. 3 illustrates a diagram of a related art light superimposer, schematically.
Figure 4:
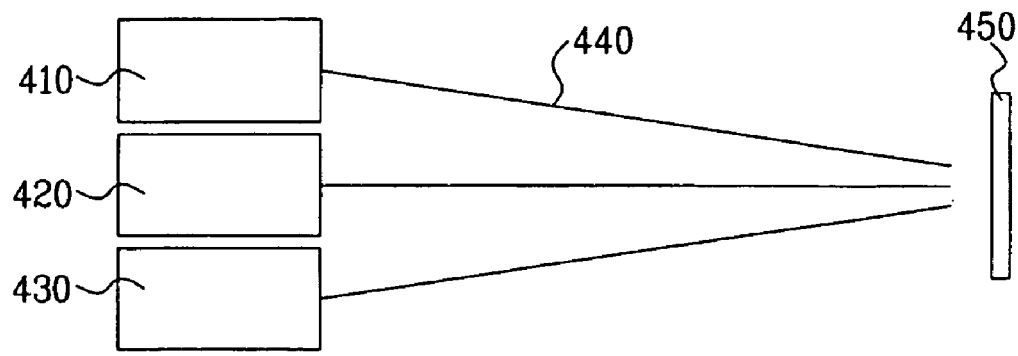
FIG. 4 illustrates a diagram of a related art light superimposer of optical fibers, schematically.
Figure 5:
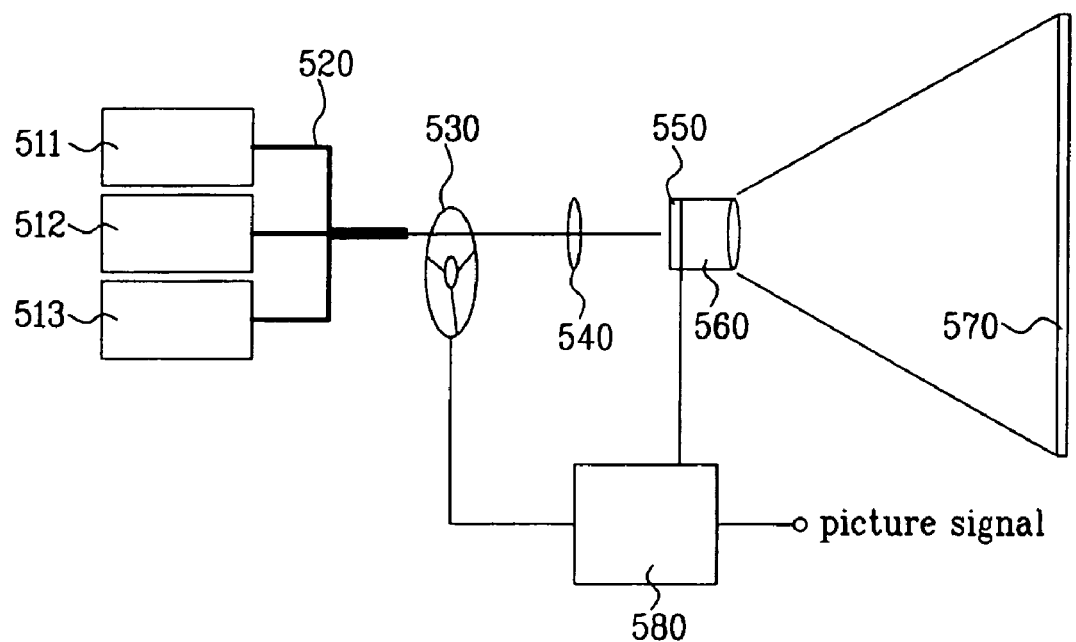
FIG. 5 illustrates a diagram of a laser display system in accordance with a first preferred embodiment of the present invention.

FIG. 5 illustrates a diagram of a laser display system in accordance with a first preferred embodiment of the present invention.

Referring to FIG. 5, the laser display system includes a red laser 511, a green laser 512, and a blue laser 513 for emitting a red beam of light, a green beam of light, and a blue beam of light respectively, a light superimposer 520 for superimposing the red beam of light, the green beam of light, and the blue beam of light, a rotational color separator 530 for separating the superimposed beam of light into the red beam of light, the green beam of light, and the blue beam of light in succession, an illuminating device 540 for irradiating the beams of light separated in succession to a display panel to be described later, a display panel 550 for receiving an electrical picture signal from a controller to be described later, and regulating a quantity of light from the illuminating device 540 based on the electrical picture signal, to form an image, a projector 560 for enlarging, and projecting the image, a screen 570 for displaying the enlarged image, and a controller 580 for matching a color area of the beam of light from the rotational color separator 530 to a color area of a color signal from the display panel 550.

The operation of the laser display system of the present invention will be described with reference to the attached drawings.

Figure 6:
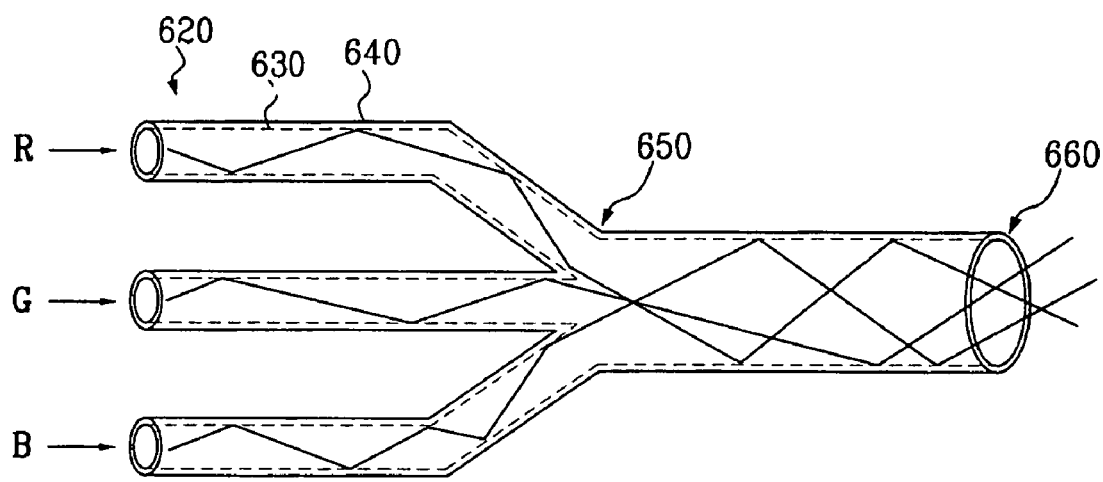
FIG. 6 illustrates a diagram of a superimposer of the present invention, schematically.

The red laser 511, the green laser 512, and the blue laser 513 emit a red beam of light, a green beam of light, and a blue beam of light, respectively. As shown in FIG. 6, the red beam, the green beam, and the blue beam enter into relevant optical fiber input parts 620 of the light superimposer 520. Then, the red beam, the green beam, and the blue beam are reflected totally owing to a difference of refractive indices between an optical fiber core 630 and an optical fiber cladding 640, to proceed along respective optical fiber cores 630, until the red, green, and blue beams are superimposed and turned into a white beam of light at an optical fiber superimposing part 650. The optical fiber superimposing part 650 has respective optical fiber cores 630 unitized into one to form one optical fiber core. The white beam of light proceeds along the one optical fiber core until the white beam of light comes out of the optical fiber output part 660.

The light superimposer 520 in FIG. 6 requires no alignment of the white lights from the related art optical fiber output parts on one plane vertically, and no binding and fastening of the related art optical fiber output parts.

Then, the white light from the light superimposer 520 transmits the rotational color separator 530, when the rotational color separator 530 separate the white light into red, green, and blue beams of light in succession, and provides to the display panel 550.

The process will be described in more detail, with reference to FIGS. 8A~8D.

For forming a color picture by using the display panel 550, a picture time period is divided into time periods of red, green, and blue color lights, and the red, green, and blue color lights are displayed on a screen in succession. That is, if the one picture time period is 1/60 seconds, the red, green, and blue color lights are displayed for 1/180 seconds respectively, to display the color picture.

Figure 7:
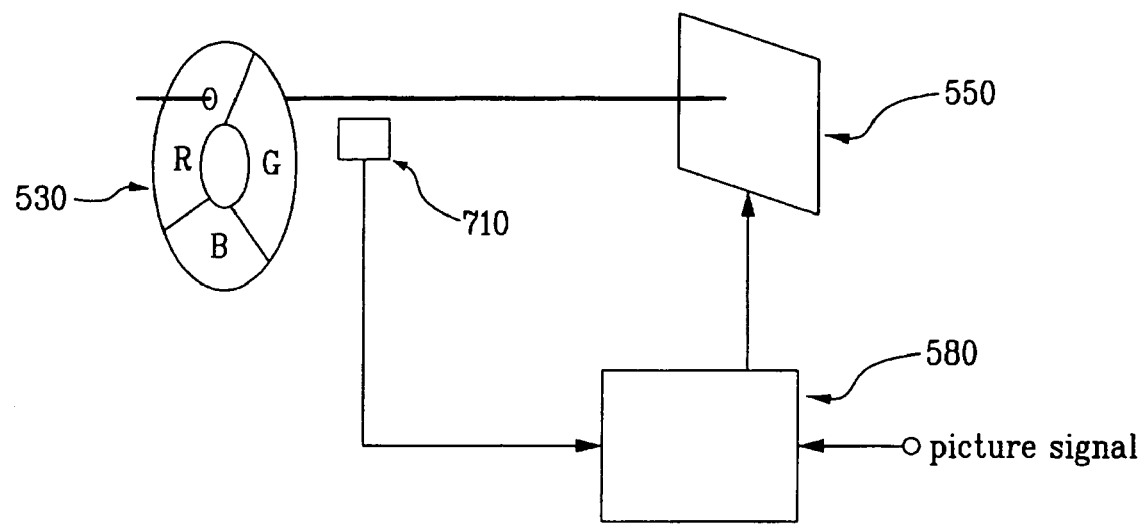
FIG. 7 illustrates a diagram of a rotational color separator of the present invention.

Referring to FIG. 7, the rotational color separator 530 has R, G, B areas for transmitting red, green, and blue beams of light respectively, such that, when the white color is incident on one of the R, G, B areas as the rotational color separator 530 rotates, only a color of the area transmits. That is, the red, green and blue beams of light are separated in succession, and proceeds to the display panel 550.

Then, the display panel 550 receives the red, green, and blue beams of light, and forms one color picture. That is, the controller 580 receives the picture signal, separates the picture signal into red, green, and blue color signals, and forwards to the display panel 550. Then, the display panel 550 displays the red, green, and blue color signals in succession, to form one color picture. In this instance, for matching a color of light separated at the rotational color separator 530 to a color of light displayed on the display panel 550, a sensor 710 is provided at the rotational color separator 530, for sensing the color of light transmitted through the rotational color separator, and providing to the display panel 550 through the controller 580. Then, the color of light separated at the rotational color separator 530 and the color of light displayed on the display panel 550 are synchronized, to form an exact color picture.

This will be described in more detail.

Figure 8A:
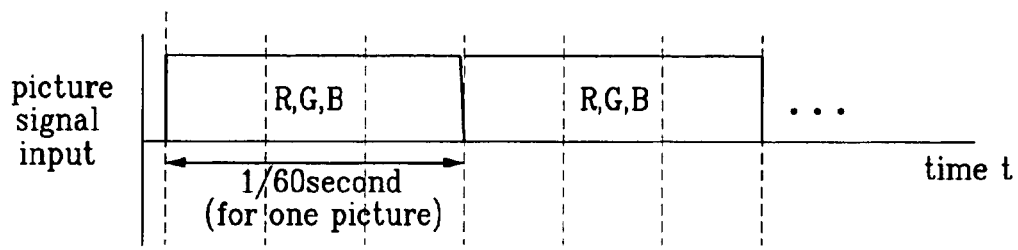
FIGS. 8A~8D illustrate a timing chart for describing a controller in accordance with a first preferred embodiment of the present invention.
Figure 8B:
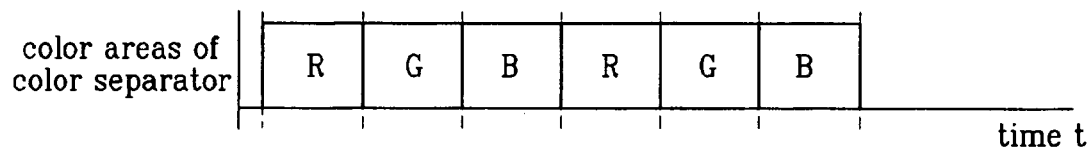
Figure 8C:
Figure 8D:
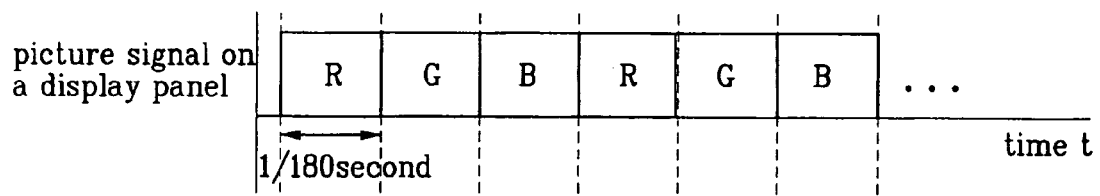

Referring to FIG. 8B, the beam of light is irradiated to the display panel 550 from the rotational color separator 530 by the illuminating device 540. In this instance, the beam of light simply has red, green, and blue color areas. Then, the controller 580 receives a picture signal (an electric signal having red, green, and blue colors mixed therein) as shown in FIG. 8A, and transmits to the display panel 550 in synchronization to a sensor signal as shown in FIG. 8C. Then, a color picture as shown in FIG. 8D is displayed on the display panel 550. That is, a color of light the same with the rotational color separator 530 is displayed on the display panel 550.

Thereafter, the picture formed on the display panel 550 is enlarged, and projected to the screen 570 by the projector 560.

Second Embodiment

Figure 9:
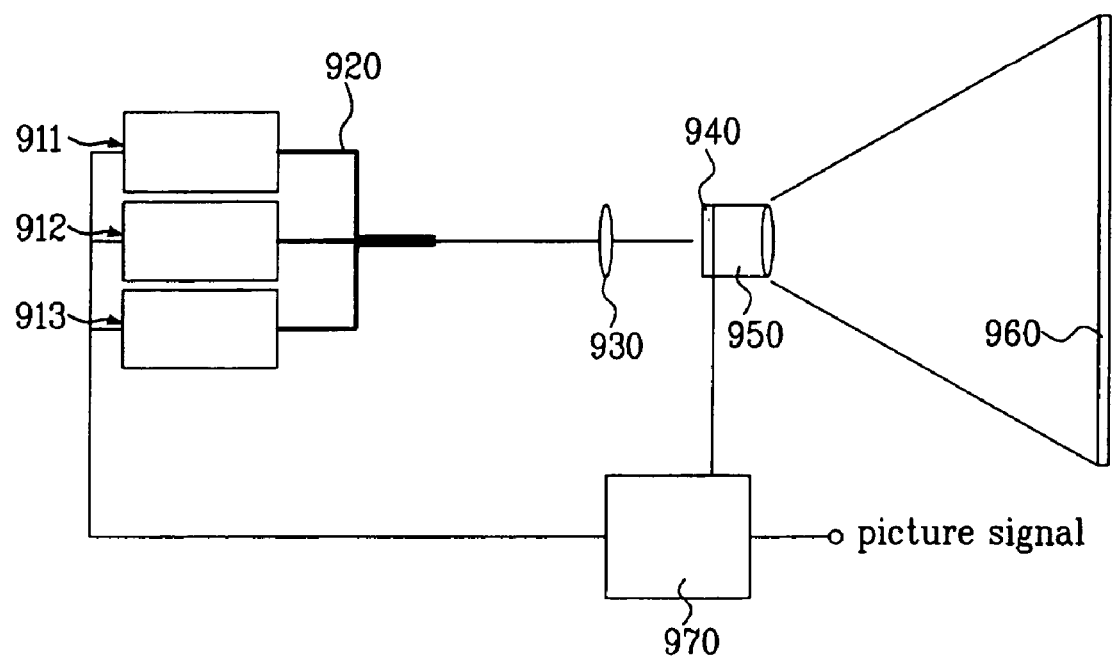
FIG. 9 illustrates a diagram of a laser display system in accordance with a second preferred embodiment of the present invention.

FIG. 9 illustrates a diagram of a laser display system in accordance with a second preferred embodiment of the present invention.

Referring to FIG. 9, the laser display system includes a red laser 911, a green laser 912, and a blue laser 913 for emitting a red beam of light, a green beam of light, and a blue beam of light, a light superimposer 920 for superimposing the red, green, and blue beams of light, an illuminating device 930 for irradiating the superimposed beam of light to a display panel to be described later, a display panel 940 for receiving the electric picture signal from a controller to be described later, and regulating a quantity of light incident thereon from the illuminating device 930 to form an image based on an electric picture signal, a projector 950 for enlarging, and projecting the image, a screen 960 for displaying the image, and a controller 970 for receiving, and separating the picture signal into red, green, and blue color signals, and turning on/off one of the lasers relevant to the red, green, and blue color signals in succession.

The operation of the laser display system of the present invention will be described with reference to the attached drawings.

The red laser 911, the green laser 912, and the blue laser 913 emit a red beam of light, a green beam of light, and a blue beam of light, respectively. As shown in FIG. 6, the red beam, the green beam, and the blue beam enter into relevant optical fiber input parts 620 of the light superimposer 920. Then, the red beam, the green beam, and the blue beam are reflected totally owing to a difference of refractive indices between an optical fiber core 630 and an optical fiber cladding 640, to proceed along respective optical fiber cores 630, until the red, green, and blue beams are superimposed and turned into a white beam of light at an optical fiber superimposing part 650. The white beam of light proceeds along one optical fiber core until the white beam of light comes out of the optical fiber output parts 660.

The light superimposer 920 in FIG. 6 requires no alignment of the white lights from the related art optical fiber output parts on one plane vertically, and no binding and fastening of the related art optical fiber output parts.

The white light from the optical fiber output part is irradiated to the display panel by the illuminating device, which will be described with reference to FIGS. 10~10E.

Figure 10A:
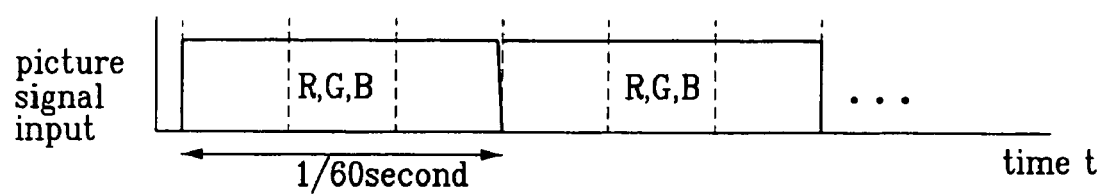
FIGS. 10A~10E illustrate a timing chart for describing a controller in accordance with a second preferred embodiment of the present invention.
Figure 10B:
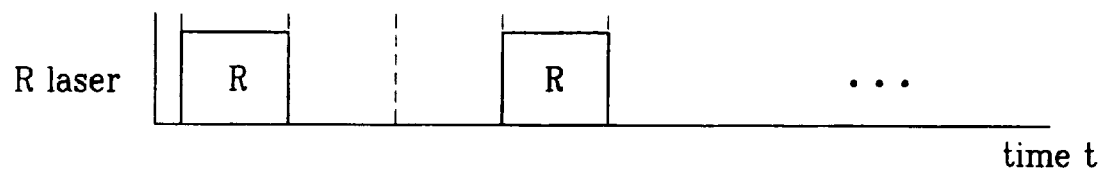
Figure 10C:
Figure 10D:
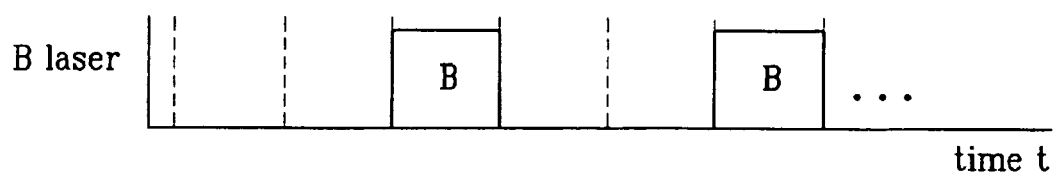
Figure 10E:
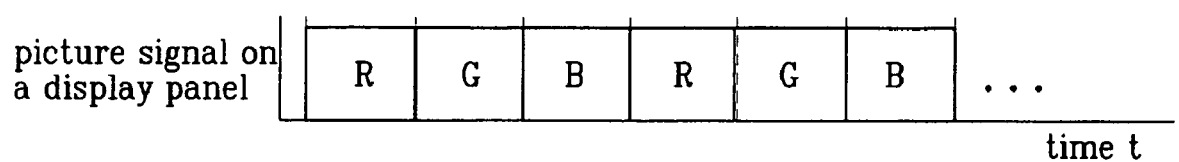

The controller 970 receives a picture signal (an electric signal having red, green, and blue color signals mixed therein) as shown in FIG. 10A, separates the picture signal into the red, green, and blue color signals, and turns on/off the red laser 911, the green laser 912, and the blue laser 913 with reference to the separated signals, for providing the R, G, B color signals as shown in FIGS. 10B~10D in succession. Then, a color picture as shown in FIG. 10D is displayed on the display panel 940. That is, a picture signal the same with the picture signal provided to the controller 970 is formed on the display panel 940.

Thereafter, the picture formed on the display panel 940 is enlarged, projected to, and displayed on the screen 960 by the projector 950.

As has been described, the laser display system of the present invention has the following advantages.

The effective superimposition and display of the beams of light from the red laser, the green laser, and the blue laser permits to improve a light efficiency, to provide a bright and clear picture.

The uniform distribution of the beams of light from the red laser, the green laser, and the blue laser permits a uniform brightness of the picture.

The simple arrangement of the red, green, and blue lasers, and optical elements permits to fabricate a smaller laser display system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A laser display system having two or more lasers as light sources, the laser display system comprising:
a light superimposer of optical fibers for superimposing beams of light from the two or more lasers;

a rotational color separator for separating a superimposed beam of light into a red beam of light, a green beam of light, and blue beam of light in succession;

an illuminating device for irradiating the red, green, and blue beams of light separated in succession to a display panel;

the display panel for receiving an electrical picture signal and regulating a quantity of light from the illuminating device based on the electric picture signal to form an image; and a controller for matching a color area of the beam of light from the rotational color separator to a color area of a color signal from the display panel.

2. The laser display system as claimed in claim 1, wherein the light superimposer makes total internal reflection of the beam of light incident thereon to proceed along a core of the optical fiber by using a difference of refractive indices between the optical fiber core and an optical fiber cladding.

3. The laser display system as claimed in claim 1, wherein the light superimposer includes;
   at least one optical fiber inlet part for receiving the red, green, and blue beams of light,
   an optical fiber superimposing part having at least one optical fiber inlet part unitized into one for superimposing the red, green, and blue beams of light to form a white beam of light, and
   an optical fiber output part for providing the white beam of light.

4. The laser display system as claimed in claim 3, wherein the optical fiber superimposing part includes optical fiber cores of the optical fiber inlet parts unitized into one, to form one optical fiber core.

5. The laser display system as claimed in claim 1, wherein the rotational color separator has areas that can transmit red, green, and blue lights respectively, such that, when a white color light is incident on the areas of the red, green, and blue lights in succession as the rotational color separator rotates, only a color light of an area the white color light incident thereon transmits.

6. The laser display system as claimed in claim 1, wherein the controller senses a color of light from the rotational color separator, and directs a signal of the color sensed at the rotational color separator to the display panel in synchronization to the sensed color.

7. The laser display system as claimed in claim 1, further comprising a sensor for sensing the color of the light from the rotational color separator.

8. A laser display system comprising:
   a red laser, a green laser, and a blue laser for emitting a red beam of light, a green beam of light, and a blue beam of light;
   a light superimposer of optical fibers for superimposing the red, green, and blue beams of light from the lasers respectively;
   an illuminating device for irradiating the superimposed light to a display panel;
   a display panel for receiving an electrical picture signal, and regulating a quantity of light incident thereon from the illuminating device to form an image based on the electrical picture signal; and
   a controller for receiving, and separating the picture signal into red, green, and blue signals, and turning on a relevant color laser in succession.

9. The laser display system as claimed in claim 8, wherein the light superimposer makes a light incident thereon to proceeds along an optical fiber core by reflecting the light totally by using a difference of refractive indices between the optical fiber, and an optical fiber cladding.

10. The laser display system as claimed in claim 8, wherein the light superimposer includes;
    at least one optical fiber inlet part for receiving the red, green, and blue beams of light,
    an optical fiber superimposing part having at least one optical fiber inlet part unitized into one for superimposing the red, green, and blue beams of light to form a white beam of light, and
    an optical fiber output part for providing the white beam of light.

11. The laser display system as claimed in claim 10, wherein the optical fiber superimposing part includes optical fiber cores of the optical fiber inlet parts unitized into one, to form one optical fiber core.

12. A laser display system having two or more lasers, a display panel for receiving an electrical picture signal, and regulating a quantity of light from the two or more lasers to form an image based on the electrical picture signal, the laser display system comprising: a light superimposer of optical fibers for superimposing the lights from the two or more lasers, wherein the light superimposer comprises:
    at least one optical fiber inlet part for receiving red, green, and blue beams of light;
    an optical fiber superimposing part having at least one optical fiber inlet part unitized into one for superimposing the red, green, and blue beams of light to form a white beam of light; and
    an optical fiber output part for providing the white beam of light.

13. The laser display system as claimed in claim 12, wherein the light superimposer makes total reflection of the beam of light incident thereon to proceed along a core of the optical fiber by using a difference of refractive indices between the optical fiber core and an optical fiber cladding.

14. The laser display system as claimed in claim 12, wherein the optical fiber superimposing part comprises optical fiber cores of the optical fiber inlet parts unitized into one to form one optical fiber core.

* * * * *